(12) United States Patent
De Koning et al.

(10) Patent No.: US 7,786,191 B2
(45) Date of Patent: Aug. 31, 2010

(54) PROCESS FOR MELT-SHAPING A POLYMER COMPOSITION

(75) Inventors: Gerardus J. M. De Koning, Beek (NL); Erik R. Peerlkamp, Emmen (NL)

(73) Assignee: DSM IP Assets B.V., Heerlen (NL)

( * ) Notice: Subject to any disclaimer, the term of this patent is extended or adjusted under 35 U.S.C. 154(b) by 728 days.

(21) Appl. No.: 10/258,488

(22) PCT Filed: Apr. 25, 2001

(86) PCT No.: PCT/NL01/00322

§ 371 (c)(1), (2), (4) Date: Mar. 25, 2003

(87) PCT Pub. No.: WO01/81067

PCT Pub. Date: Nov. 1, 2001

(65) Prior Publication Data

US 2003/0160358 A1 Aug. 28, 2003

(30) Foreign Application Priority Data

Apr. 25, 2000 (NL) .................................... 1015010

(51) Int. Cl.
*B29B 7/00* (2006.01)
*B29B 9/12* (2006.01)

(52) U.S. Cl. ........................ 523/351; 264/122; 264/211; 264/211.21

(58) Field of Classification Search .................. 523/351; 264/109, 122, 211, 211.21; 425/204, 205
See application file for complete search history.

(56) References Cited

U.S. PATENT DOCUMENTS

| 4,161,419 | A | * | 7/1979 | Alia ............................. 156/51 |
| 4,510,271 | A | * | 4/1985 | Muhle et al. ................. 523/346 |
| 5,110,521 | A | * | 5/1992 | Moller ....................... 264/40.4 |
| 5,213,724 | A | * | 5/1993 | Saatkamp ................. 264/37.32 |
| 5,424,013 | A | * | 6/1995 | Lieberman ................. 264/40.1 |
| 5,756,020 | A |  | 5/1998 | Locke et al. |

FOREIGN PATENT DOCUMENTS

| EP | 997184 | * | 5/2000 |
| GB | 2.262.905 |  | 7/1993 |

OTHER PUBLICATIONS

Patent Abstracts of Japan, vol. 017, No. 397, English abstract of JP 05 077241.
Patent Abstracts of Japan, vol. 012, No. 201, English abstract of JP 63 005907.

\* cited by examiner

*Primary Examiner*—Mathieu D. Vargot
(74) *Attorney, Agent, or Firm*—Nixon & Vanderhye P.C.

(57) ABSTRACT

The invention relates to a process for melt-shaping a polymer composition wherein the constituent components for the polymer composition are supplied directly to the shaping device in the form of a mixture of granules on or in which the constituent components are present. The granule mixture contains at least 3 granule-fractions containing the matrix polymer that differ in composition.

Figure 1:
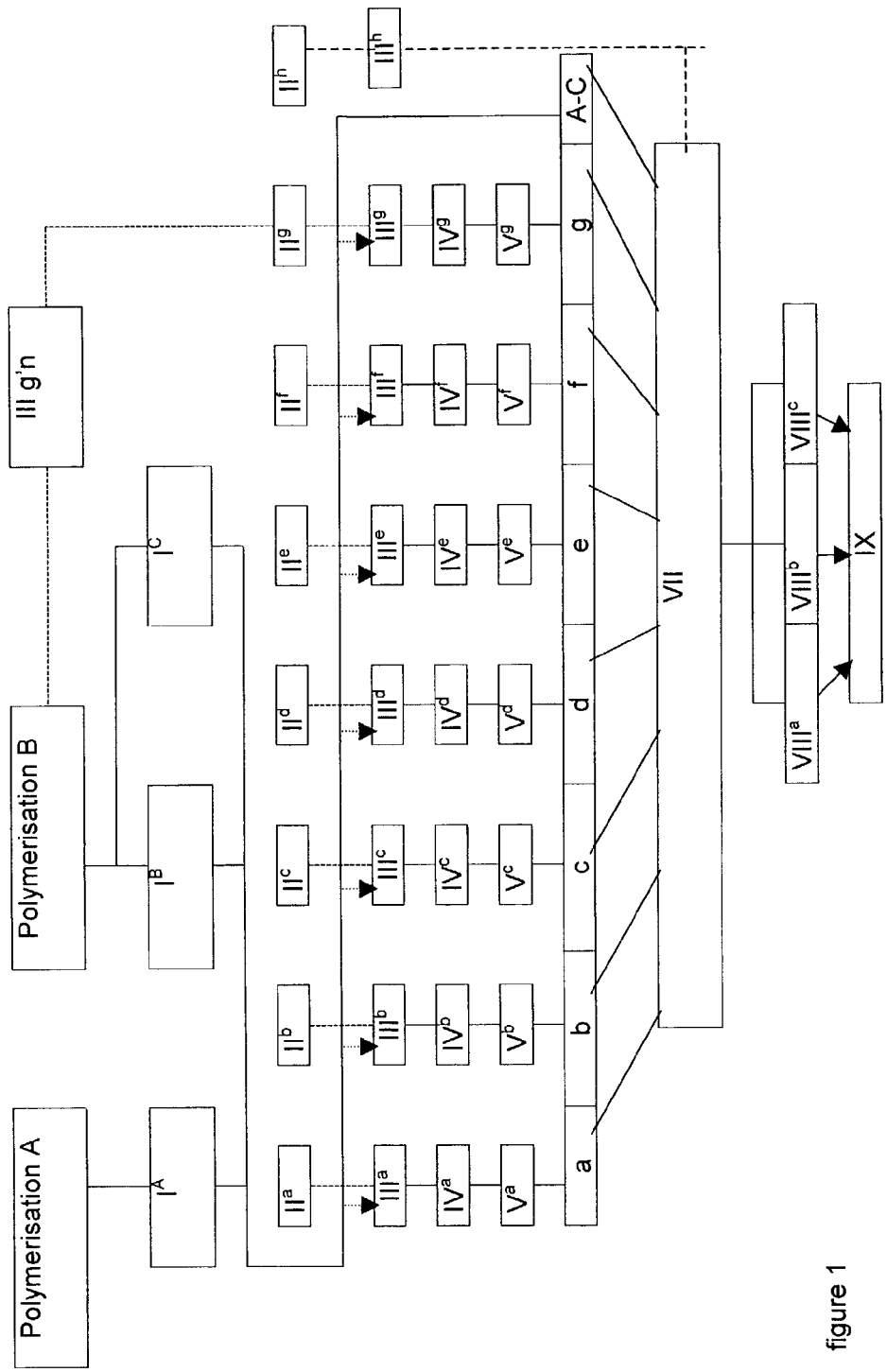

The invention also relates to the granule mixture suitable for the melt-shaping process, the installation for the preparation and the process for preparing the granule mixture. The process results in a greater reproducibility and in articles with improved properties.

25 Claims, 1 Drawing Sheet

PROCESS FOR MELT-SHAPING A POLYMER COMPOSITION

CROSS REFERENCE TO RELATED APPLICATION

This application is the National Phase of International Application PCT/NL01/00322 filed Apr. 25, 2001 which designated the U.S., the entirety of which is incorporated herein by reference.

The aim of the invention is to provide a process for supplying a plurality of different components in controlled amounts to a device for melt-shaping a polymer composition.

The polymer composition is understood to be a composition whose continuous phase consists of a matrix polymer in which the other components of the composition are dissolved or dispersed. Such a composition is in this application also referred to as a compound.

Granulate is understood to be a collection of granules. When the granules differ in composition the term granule mixture is used.

Granules differ in composition when their polymer matrices consist of different polymers and/or the additives present in and/or on the granules differ.

Additives are in principle understood to be all kinds of substances that are used in polymer compositions for the purpose of modifying or adding new properties. These properties may relate to both the product obtained from the composition and to the properties of the granulate. Examples of types of additives are substances with a stabilising effect, processing aids, colorants, flame retardants, reinforcing materials, substances for improving impact resistance, fillers and other polymers.

Such a device for melt-shaping is for example an injection-moulding machine that is used to shape a multitude of products from a wide variety of polymer compositions.

The polymer composition desired for this purpose is usually supplied as a single granulate consisting of granules that all have the same desired composition. Such a granulate is generally obtained by supplying all the individual constituent components of the polymer composition in controlled amounts to a twin-screw extruder, in which high shear rates and forces usually prevail, and mixing them into the polymer melt, compressing the melt of the composition thus obtained into strands which are subsequently, after cooling, chopped into granules, which after drying are packed in a container and are subsequently conveyed to the melt-shaping device.

This process for the preparation of the polymer composition is relatively complex, prone to failure and difficult to reproduce. For example, quantities of the polymer of several hundred kilograms an hour must be homogeneously mixed with for example a thousand-fold smaller quantity of additives, for example stabilisers, and varying quantities of strongly differing materials, such as glass fibres and fluid pigments, simultaneously dosed and mixed in. Several technical solutions to this problem have been proposed. To avoid the problem of dosing quantities in strongly differing orders of magnitude, use is for example made of a premixer in which additives are premixed in the solid phase. Different dosage points in the melting and/or mixing sections of the extruder are used for adding components with different physical characters. These partial solutions to the various problems lead to relatively large amounts of material-specific peripheral equipment on or ahead of the extruder, which greatly reduces the flexibility of the production process and makes it necessary to make many adjustments in switching from the production of one composition to another. This unduly limits the extruder's effective operating time.

Another disadvantage that may be encountered especially when larger quantities of inorganic fillers or reinforcing fibre material, for example glass fibre, need to be incorporated is the occurrence of so-called hot spots, involving the local occurrence of very high temperatures in the polymer melt, which may lead to (partial) decomposition of other components, thus annulling their effect, and to discolouration of the composition.

To meet the aforementioned objections, WO93/18899 proposes supplying all the constituent components in a solid form in controlled amounts to a mixer, in which the different components, and in particular glass fibre, are premixed under strictly controlled conditions and are subsequently supplied to a hopper to be fed to an injection-moulding machine. Separate measures are then taken for incorporating the glass fibres. This solution would however mean that for example every injection-moulding machine would have to be equipped with means of measuring the quantities of the different components (in particular weighing equipment); means of conveying the various components to the weighing equipment and means of conveyance to the mixer. Besides the required investments, the injection-moulding process including the dosing systems would again become complex and prone to failure, and the problems associated with the production, to specification, of granules for a plastic granulate that all have the same desired composition would de facto be shifted to the injection-moulding and extrusion processes respectively, and the process proposed in WO93/18899 seems to be advantageous in only one case, namely in injection-moulding large series of a single type of objects with only few changes in the desired plastic composition. A specific example of this is to be found in U.S. Pat. No. 576,020, in which a thermoplastic polymer and at least 2 pigment concentrates are separately supplied to an extruder via gravimetric dosing devices, the thermoplastic polymer and the at least 2 pigment concentrates are melted, the thermoplastic polymer and the pigment concentrates are mixed in the melt and the mixture obtained is subsequently extruded into an object. The pellets contain only one colourant. Other additives may be present in the same pellets. This process presents the advantage that the colour may in a relatively simple way be corrected at the final processor by adjusting the dosage of the pigment concentrates. However, a relatively long residence time, of up to approx. 10 minutes, in the mixing extruder is required for this process.

The inventors have sought for a process that requires few to no adjustments at the final processors of the polymer compositions into melt-shaped objects in comparison with the use of a granulate of a type of granules which already contain all the components of the composition, offers the granulate producer a relatively large amount of flexibility in producing different complex compositions, thus promotes a high effective operating time of the employed production means, is not very susceptible to failure and, besides other advantages, especially in the case of mineral-filled compositions, reduces the risk of thermal damage of the polymer and other additives.

The process according to the invention for the addition of a plurality of different types of components of a polymer composition in controlled amounts to a device for melt-shaping a polymer composition is characterised in that the constituent components for the polymer composition are supplied directly to the shaping device in the form of a mixture of granules on or in which the constituent components are present in the desired ratio.

It is preferred that essentially all the constituent components of the polymer composition to be shaped are supplied according to the invention in the form of a granule mixture. It is considered that, in order to facilitate the shaping process, minor amounts of processing aids, may be added separately. Nevertheless, it is preferred that also such processing aids are included in the granule mixture.

A polymer composition is here understood to be a composition whose matrix, after melt-shaping, consists of a polymer resin in which the other components of the composition are dissolved or dispersed. In principle, any polymer that can be melt-shaped and that subsequently becomes rigid may be used as the polymer resin. The polymer is preferably a thermoplastic polymer. The process may however also be used for thermosetting polymers. The polymer may be a homopolymer, a copolymer or a mixture of polymers, preferably a homopolymer or a copolymer. In particular, the process is suitable for polymers chosen from the group comprising polyolefins, thermoplastic polyesters, polyamides, polyethers, acrylonitrile-butadiene-styrene copolymer (ABS), polycarbonates and polyacrylates and comprises both homopolymers and copolymers thereof, for example polyethylene, polypropylene, propylene-ethylene copolymer, polyesters obtained from aliphatic diols and cycloaliphatic or aromatic dicarboxylic acids, for example polyethylene terephthalate and polybutylene terephthalate, polyesters obtained from aromatic diols and aromatic dicarboxylic acids, copolyesters, for example elastomeric block copolyesters, more in particular copolyether esters, polyamides derived from aliphatic diols and aliphatic dicarboxylic acids and/or aromatic dicarboxylic acids and polyamides derived from α,ω amino acids, for example polyamide 4, polyamide 4.6, polyamide 6 and polyamide 6.6, polyamide 8 and polyamide 12, polyamide 6.T and 6.I and copolyamides thereof, polycarbonates derived from diphenylpropane, or tetramethyldiphenylpropane, in which some of the methyl groups have optionally been replaced by halogen, for example Br.

The other components of the composition in principle comprise all types of additives that may be used in polymer compositions, for example stabilisers, processing aids, pigments, flame retardants, substances for improving impact resistance, reinforcing fibre materials, fillers and other polymers.

As for stabilisers a distinction may be made between the group of additives that improve the composition's resistance to thermal oxidation and the group of additives that improve the resistance to the effect of light or the resistance to the effect of solvents or water. Such stabilisers are often effective specifically per polymer and known to those averagely skilled in the art. Stabilising additives of a particular type, e.g. thermal stabilisers, are often supplied as a mixture, with a synergistic effect, comprising more than one component. In the context of this invention such a mixture is regarded as a single additive.

Processing aids are additives which affect for example the flow behaviour of the polymer composition, the release of the product produced from the mould, the polymer's crystallisation behaviour or the flow behaviour of the polymer granules in the inlet of the melt-shaping device. Examples hereof are aliphatic fatty acids and salts thereof, for example Ca stearate, aliphatic alcohols, low-molecular polymer waxes, for example polyethylene wax, silica and talk.

For various applications the composition must contain a flame retardant to ensure compliance with the fire safety requirements. In principle, any flame-retardant additive that will ensure compliance with the requirements may be used in the composition. Known flame-retardant additives are phosphorus and phosphorus-containing organic or inorganic compounds, nitrogen-containing compounds, for example melamine, melamine condensates and compounds derived from melamine, combinations of nitrogen and phosphorus-containing compounds, halogen-containing compounds, for example bromine-containing compounds, for example brominated polystyrene, optionally in the presence of a synergistically effective compound, for example a metal oxide, for example antimony oxide or zinc oxide, water-separating compounds, for example magnesium hydroxide or aluminium hydroxide dihydrate and other compounds known to those skilled in the art.

Substances improving the impact resistance are generally polymer compounds with a glass transition temperature lower than 20° C., preferably lower than 0° C., even more preferably lower than −20° C. In principle, all substances for improving the impact resistance currently known and yet to be developed are suitable for use in the composition. Examples are ethylene-propylene copolymers and terpolymers, ethylene-octene copolymers, ethylene-(meth)acrylate copolymers, styrene-butadiene block copolymers, elastomeric copolyesters, for example polyether esters. These substances for improving impact resistance may optionally be provided with functional groups for example derived from ethylenically unsaturated dicarboxylic acids, for example maleic acid or maleic anhydride, fumaric acid, etc.

In principle, the composition may contain all the customary colorants, for example pigments and polymer-soluble colorants. The process according to the invention is particularly suitable for the use of composite colours. To obtain a desired colour in the product obtained from the melt it will in practice often be necessary to use a combination of colorants, for example present in a granule mixture of colour concentrates as described in U.S. Pat. No. 576,020. In the context of this application such a combination of colorants is regarded as a single type of additive.

All customary reinforcing fibre materials are in principle suitable for use in the composition. Examples of such fibre materials are inorganic fibres, for example glass fibres or carbon fibres, and organic fibres, for example aramide or ultra high molecular polyethylene (UHWPE) fibres. Other reinforcing materials are for example wollastonite, mica and lamellar clay particles.

Fillers that are widely used are for example talk, chalk and barium sulphate.

Other polymers, insofar as they have not yet been mentioned, may be present in the composition as an additive to modify properties not yet mentioned, and may vary from case to case. Such polymers may be fully miscible, partly miscible or immiscible with the matrix polymer. These other polymers may also be present in the composition to act as a carrier for the additive. In that case their concentration is limited as much as possible to avoid introducing adverse effects on the properties of the polymer composition.

The final concentration of the various additives in the composition may vary within a wide range and is determined especially by the requirements imposed on the product obtained by melt-shaping using the process according to the invention. In general this total concentration will be between 0.01 and 5 wt. %, preferably between 0.1 and 3 wt. %, in the case of stabilisers, between 0.1 and 5 wt. %, preferably between 0.1 and 3 wt. %, in the case of processing aids, between 1 and 25 wt. %, preferably between 2 and 15 wt. %., in the case of flame retardants, between 0.1 and 20 wt. %, preferably between 0.2 and 10 wt. %, in the case of colorants, between 1 and 60 wt. %, preferably between 2 and 30 wt. %, in the case of reinforcing fibre materials and between 2 and 70 wt. %, preferably between 2 and 50 wt. %, in the case of other fillers. Preferably each individual additive is present only in or on one of the types of granules of the granule mixture. The concentration of the additives in this fraction of the granules is preferably substantially higher than the calculated final concentration of the entire composition. Preferably the ratio of the concentration of an additive in or on one type of granule and the calculated concentration of the entire composition is between 1.25 and 50, more preferably between 1.5 and 30, even more preferably between 1.75 and 20.

For technical reasons it may in the case of certain polymers however be preferable for one or more additives, more in particular a stabiliser or a combination of stabilisers, more in particular a thermal stabiliser, to be added to the polymer of the matrix already during the synthesis process, as a result of which this additive will be present in all the granules containing the matrix polymer.

In certain circumstances it may also be advantageous for all the granules to have the same coating, for example one containing a processing aid, more in particular a processing aid that favourably affects the granules' flow behaviour.

Leaving these situations out of consideration, every granule preferably contains only one additive.

A granule is in the context of this application understood to be a particle of defined dimensions. These dimensions may originate in the shape in which the polymer is recovered from the polymerisation installation or may be determined by means of shaping techniques. The largest size of the granules is preferably between 0.1 and 25 mm, more preferably between 0.2 and 10 mm, and the smallest size between 0.1 and 10 mm, preferably 0.2-4 mm. The granule's shape may vary from highly irregular to spherical. Preferably the granule's shape is cylindrical or spherical or the granule has a shape anywhere therebetween. Such shape presents the practical advantage of relatively good flow properties in the various parts of the installation for preparing the composition according to the invention to be described below. Preferably the dimensions of the types of granules with different compositions are of the same order, more preferably approximately the same, to prevent segregation during transport. An equal granule shape also presents the advantage of easy standardisation and control of the dosing devices in the aforementioned installation according to the invention and in the melt-shaping device. If the additive is present on the granule it may be advantageous for the surface of the granule to contain cavities in which the additive is present. In this context the for example cylindrical granule may have ridges extending in the direction of the longitudinal axis, and a spherical granule may have a roughened surface. In the case of a coating, a granule shape with the highest possible surface area/weight ratio is preferably chosen. The coating will usually not be allowed to exceed a maximum thickness to prevent attrition. The greatest possible loading of the granules with additive is in that case obtained when the granules have the smallest possible dimensions.

Via the choice of the fractions of the granules containing different additives, optionally supplemented with granules of the matrix polymer that contain no separate additives, it is easy to supply a wide variety of compositions to the device for melt-shaping a polymer composition. This granule mixture is supplied directly to the inlet of the melt-shaping device, which means that there is no need for mixing with other components or dosage.

The granule mixture for use in the invention according to claim 1 may be prepared in an installation comprising:

a) a plurality of storage vessels for the constituent components for the granules of the granule mixture, comprising a1) at least one storage vessel for polymer granules obtained in the polymerisation process for the preparation of the matrix polymer;

b) means of dosing the individual components;

c) means of obtaining polymer compositions comprising granules containing the matrix polymer in or on which is at least one additional constituent component;

d) optional storage vessels for the granules obtained from the means mentioned under c);

e) a device for dosing the granules from the means mentioned under c) or d) and optionally a) to f) a mixing device for obtaining a homogeneous granule mixture.

The installation includes means of conveying the constituent components and the granules between the various means a-f which form part of the installation according to the invention.

The installation may optionally also include one or more means of applying one or more additives as a coating to all the granules of the composition. Such means are preferably located immediately downstream of the mixer f).

The various storage vessels (a) are chosen in accordance with the physical form of the various constituent components and the required quantities thereof. The storage vessels are optionally fitted with means of conditioning the components, for example drying or the exclusion of oxygen.

At least one of the vessels is designed for the storage of the polymer granules obtained in the polymerisation process of the matrix polymer.

In principle any of the usual means are suitable for use as the means of dosing the individual components to the means of obtaining polymer compositions comprising granules containing the matrix polymer, in or on which at least one additional constituent component is present; if the constituent component is in a fluid form, use is preferably made of a volumetric feeder, and, if the constituent component is in a solid form, use is preferably made of a gravimetric feeder. Such feeders must be adjusted to the amount of component that is to be added per unit time and the form in which this component is presented. Examples of suitable dosing means are pumps, for example gear pumps, peristaltic pumps, plunger positive displacement pumps and membrane positive displacement pumps, volumetric screw conveyors, tipping balances and so-called L.I.W. (loss in weight) feeders.

As means of obtaining granules containing the matrix polymer on or in which is at least one additional constituent component use may be made of the customary means in which a polymer granule is entirely or partly covered with a coating containing the additional constituent component or in which the polymer and the additional constituent component are mixed in the melt, which is subsequently shaped into granules. Devices for covering granules with a coating containing the additional constituent component are for example known from EP 0913239A, DE-A-3409953, U.S. Pat. No. 5,006,368, U.S. Pat. No. 5,141,772, U.S. Pat. No. 45,111,603 and EP-B-0608510 and comprise tumble dryers, fluid-bed equipment, high-speed mixers and pneumatic conveying systems.

Especially suitable for melt-mixing followed by shaping into granules are the various forms of extrusion machines, for example single-screw and twin-screw extruders.

The device for dosing the granules to the mixing device comprises separate gravimetric feeders for each granule composition, whose throughputs are controlled by a control system. This gravimetric feeder control system stops and starts each individual gravimetric feeder depending on the recipe for the overall composition that is to be obtained. Such gravimetric feeders and such a control system are commercially available, for example the K9X feeders and the K-Commander of KTRON North America, Pitman N.J.

The device for mixing the types of granules with different compositions into a homogeneous granule mixture may in principle be chosen from among different types, which may be operated batch-wise or continuously, for example tumble dryers, high-speed blenders, fluidised bed mixers, ribbon mixers, paddle mixers, gravity tubes with mixing pins and air jet mixers.

In principle, any means of conveying solid particles and optionally substances in a liquid form may be used for conveying the constituent components between the various means of the installation according to the invention, for example pneumatic means of conveyance, conveyor belts, vibrating troughs, gravity tubes, screw conveyors and pumps.

The granule mixture suitable for use in the process according to the invention is characterised in that it comprises at least 3 granule fractions having different compositions, the composition of one of the granule fractions being comprised by the compositions of the at least 2 other granule fractions. Preferably the granule mixture comprises at least 4, even more preferably at least 5 granule fractions. Most advantageous is for the granule mixture to contain at least 6 granule fractions with different compositions. In addition to these granules containing the matrix polymer, the granule mixture may optionally also contain granules that consist of additive, optionally in the presence of a binder, for example granules of colour concentrates in a wax. The compositions of the granule fractions preferably differ in only one component. It is advantageous if the dimensions of the granules in the different granule fractions differ little from one another, so that segregation during transport and dosing is minimised. Preferably the granules all have the same dimensions. The granules are preferably cylindrical or spherical or have a shape anywhere therebetween.

The granule mixture suitable for use in the process according to the invention may be obtained by a process comprising:
a) the addition of polymer in a granular form or optionally in melted form obtained in a polymerisation process to a series of parallel-connected mixing devices;
b) the mixing in each mixing device of polymer with a controlled amount of preferably one additive, optionally followed by shaping into granules;
c) the subsequent separate conveyance of the granules obtained under b) from the separate mixing devices to different storage vessels;
d) the conveyance of granules from at least 2, preferably at least 3, more preferably at least 4 and most preferably at least 5 of these parallel storage vessels to a dosing device;
e) the separate dosage of these different streams of polymer granules obtained under b) and a stream of polymer granules obtained directly from the polymerisation process and optionally other granular components, optionally via interim storage, to a mixer;
f) the mixing of the granule streams in this mixer at a temperature below the melting point of the polymer granules to form a homogeneous granule mixture of the desired composition;
g) the feeding of the granule mixture obtained from the mixing device to means of conveying the granule mixture to an installation for processing the granule mixture.

The granules of the mixture may optionally all be provided with a coating consisting of one or more additives. Preferably the granule mixture leaving the mixer is to this end passed through a device for applying a coating. Although less attractive, the application of the coating may also coincide with the mixing of the granule fractions. Such an additional process may be advantageous if the granules are provided with an external lubricant.

With the process described above a wide variety of compositions of the granule mixture may be obtained by varying only the dosage of the various granule streams to the mixer. The most favourable conditions, which in principle need not be varied, may be chosen for the addition of the additives in or on the individual polymer granules.

As the mixing may ultimately be effected with identically shaped particles, a high degree of homogeneity is also obtained and simple dosing equipment will suffice for the mixer.

The individual dosing/mixing steps are virtually unsusceptible to failure because, first of all, only one constant amount of additive need be dosed and incorporated under optimum conditions per granule stream and, secondly, the granule streams to be mixed are combined in a simple mixing device using identical dosing techniques.

Any undesired deviations that may occur may often be relatively simply corrected through the extra addition of one or more granule fractions to the off-spec. composition.

The process is particularly advantageous in the preparation of compositions in which the additives must be handled with great care for environmental reasons. Glass fibres, mineral fillers, for example silica, and other strongly dusty materials posing a health hazard may be mentioned in this context. They may now be incorporated in the polymer granule in specially designed smaller production areas, whereas with the processes according to the state of the art the larger equipment for the final mixing of the constituent components in the melt into a single compound granulate needed to be provided with a plurality of special provisions.

FIG. 1 depicts an installation for carrying out the process.

EXAMPLE 1

The invention will now be further elucidated with reference to FIG. 1. It will be clear to those skilled in the art that many equivalent variants of the various steps in the process and explicitly mentioned means in the installation are feasible, and the invention is not therefore restricted to the embodiment of the installation shown in FIG. 1 (Example I) and the other examples (II-III) of the processes according to the invention.

Explanatory Notes on the Installation in FIG. 1

The polymer storage vessels $I^A$-$I^C$ are filled with polymer obtained from one or more polymerisation installations. In general, vessels $I^A$-$I^C$ will contain the same polymer of different degrees of polymerisation. As indicated in the figure, polymer A may in principle also differ from polymers B and C.

The polymer may be present in vessels I in a solid or a melted form. If in a solid form, the polymer particles preferably already have the dimensions of the granules in the granule mixture according to the invention.

The polymer storage vessels may be connected to the polymerisation installation(s), so that the polymer may be introduced into the storage vessels directly. The polymerisation installation and polymer storage may however also be located in different areas, necessitating intermediate conveyance. In principle, all the usual techniques may be used to convey the polymer from the polymerisation installation to the storage vessels; in the case of melted polymer for example pumping through heated or insulated pipelines, in the case of polymer in a granular form preferably by means of pneumatic conveyance or in boxes or bulk carriers which are preferably provided with means enabling them to serve as storage vessel I, too. Silos are preferably used for storing granules.

Storage vessels $II^a$-$II^h$ are for storing the various additives that are to be used in the composition according to the invention. These storage vessels vary substantially in shape and capacity, depending on the physical properties of the additive and the quantities in which it is used. In general, the storage vessels are provided with means with which the desired conditions for the additive may be maintained. Means, for example a gas inlet and a gas outlet, are present for example for maintaining a dry or inert gas atmosphere above the additive, means for heating the storage vessel to keep or bring the additive in/into a fluid form, etc.

Dosing devices $III^a$ up to and including $III^h$ generally comprise a control system and 2 different means of dosing polymer and additive, or the control system is used to set the desired ratio of the polymer and the additive, which are supplied to mixer IV by the 2 different dosing means. If the additive is in a fluid form, a volumetric form of dosage is preferably chosen. Gravimetric forms of dosage are preferable for the polymer in a granular form and solid additive.

Mixers $IV^a$-$IV^g$ are provided with means for introducing the polymer and the additive. These inlets may be positioned in different places in the mixer or optionally in one place. In the latter case a premixer of the "dryblender" type is preferably present. At least 2 types of mixers may be distinguished. In a first type a coating consisting of the additive is applied to the polymer granule, for example a tumble dryer with an inlet for the polymer granules and an inlet for the additive that is preferably applied to the polymer granules in the mixer in the fluid phase, for example in a solvent or binder or at elevated temperature in a melted form. Another embodiment for such a mixer is for example a fluidised bed of polymer granules over which the additive is sprayed. A fluid-bed mixer is particularly suitable for continuous operation. The second type is suitable for melt-mixing the polymer and the additive followed by shaping into a granule. A representative of a mixer of this type is the mixing extruder, where the polymer and additive may both be supplied to the throat, optionally after premixing in the solid phase, or polymer is supplied to the throat and additive in a later stage. For example for incorporating glass fibres it may be advantageous for the extruder to be provided with a means of supplying this additive to the already melted polymer (so-called side feed or down-stream). The extruder is particularly suitable for continuous operation.

The granules with different compositions obtained from mixers IV are subsequently stored in storage vessels $V^a$-$V^g$. Like storage vessels II, these storage vessels are provided with conditioning means and an outlet to dosing device VI. This dosing device is provided with a control system with which amounts of compositions from a number of the intermediate storage vessels $V^a$-$V^g$ and one of the storage vessels $I^A$-$I^C$ are simultaneously or successively dosed to mixer VII in a desired ratio. When the polymer granules from the intermediate storage vessels and storage vessel all have the same dimensions, a single dosing device, preferably gravimetric, will often suffice to dose all types of granules.

The mixer is specially designed for mixing polymer granules while limiting attrition. Suitable mixers are the mixers already mentioned above in this specification, it being noted that this enumeration is not exhaustive.

The mixer is optionally also provided with means of heating the mixer, to enable further polymerisation in the solid phase during the mixing with suitable polymers, for example polyesters and polyamides.

The mixer is optionally also provided with one or more means of adding one or more additional additives which is or are, in the presence or absence of binders/or solvents, deposited as a thin layer on all the polymer granules. To avoid contamination, such means of adding additional additive to or on all the granules is however preferably present downstream of the mixer's outlet, in the means, preferably pneumatic, of conveying the granules to the means ($VIII^a$-$VIII^c$) of conveying the granule mixture to the end users. Such a means of applying additive to polymer granules is for example described in U.S. Pat. No. 4,511,603, in which additive is sprayed onto passing granules from the inside of a bend in a pneumatic conveyor.

Means of transport ($VIII^a$-$VIII^c$) are for example bags, so-called octabins and bulk carriers. With respect to filling these means of transport it is sometimes useful for the granule mixture leaving mixer VII to be collected in a buffer silo (not shown) first, which silo is provided with means for filling means of transport VIII. The versatility of the process according to the invention will be evident from the following examples.

EXAMPLE II

Polymer storage vessels $I^B$ and $I^C$ contain, respectively, polyamide-6 with a $\eta_{rel}$=2.2 and polyamide 6 with a $\eta_{rel}$=2.4 in a granular form (cylinder d=2 mm l=3 mm).

Vessels $II^a$, etc. contain:

glass fibre, diameter 12 μm and length 3 mm, PPG 3545 from PPG, France ($II^a$)

talk, Stealene® B ($II^b$)

maleic acid-modified EP rubber, Tafmer MP® 0610, from Mitsui, JP ($II^c$)

melamine cyanurate (Mecy); Melapur®, MP200, from DSM, the Netherlands ($II^d$)

Ca stearate ($II^e$)

carbon-black concentrate (30 wt. %) in polyethylene granules with low melting points, lenticular, d=2 mm l=3.5 mm ($II^g$)

colour concentrate consisting of CdS in pentaerythritol monostearate (melting point 52° C.), granules, spherical, d=0.3 mm ($II^f$)

Irganox® 1098 stabiliser from Ciba, Switzerland ($II^h$).

The PA-6 from vessel $I^B$ and the glass fibre are dosed to the throat of a ZSK 57 twin-screw extruder from Werner and Pfleiderer, Germany, and are then incorporated under conditions familiar to those skilled in the art for mixing glass into compounds. The mixture obtained is then extruded into granules (d=2 mm l=3 mm). Dosage is controlled so that the glass fibre content is ultimately at a level of 45 wt. %, relative to the PA+glass fibre. The granules obtained are subsequently supplied to and stored in silo $V^a$.

Again using a ZSK 57 twin-screw extruder, PA-6 from vessel $I^c$ and talk are mixed in a 50:50 weight ratio, the PA-6 and talk both being dosed to the throat. The granulate thus obtained through extrusion is stored in silo $V^B$.

Again using a ZSK 57 twin-screw extruder, the agent for improving impact resistance is under conditions of high shear forces mixed in a PA-6: Tafmer weight ratio of 60:40, resulting in a highly uniform, fine dispersion of the rubber in the PA matrix. The PA-6 is obtained from silo $I^B$. The granulate obtained (l=3 mm d=2 mm) is stored in silo $V^c$.

In the same way a PA-6/Mecy=50/50 composition is prepared under conditions that result in a good dispersion of Mecy in the PA-6 from silo $I^c$ and subsequently storage of the dried granulate in silo $V^d$.

Ca stearate and PA-6 from $I^c$ are mixed in a 25:75 weight ratio in a ZSK 40 twin-screw extruder. The granulate, l=3 mm d=2 mm, is stored in silo $V^e$.

Using the equipment and process of Example I in U.S. Pat. No. 4,985,187, mixing in a turbo-mixer at a temperature of <50° C., in a 2.5:100 weight ratio, the CdS colour concentrate is applied to PA-6 granules from $I^c$. These granules are stored in silo $V^f$.

TABLE 1

| Silo No.<br>Granule composition<br>[weight ratio] | $V^a$<br>GF/PA-6<br>45/55 | $V^b$<br>talk/PA-6<br>50/50 | $V^c$<br>TAFM/PA-6<br>40/60 | $V^d$<br>Mecy/PA-6<br>50/50 | $V^e$<br>CaSt./PA-6<br>25/75 | $V^f$<br>CdS/PA-6<br>1.8/98.2 | $I^c$<br>PA-6 | $II^g$<br>carb.bl./PE |
|---|---|---|---|---|---|---|---|---|
| composition of mixture [weight: parts] | | | | | | | | |
| 1 | 44.4 | — | 15 | — | 1.2 | — | 37.4 | 2 |
| 2 | 44.4 | — | 15 | — | 1.2 | 33.3 | 16.0 | — |
| 3 | 22.2 | 40 | 10 | 20 | 1.2 | — | 4.6 | 2 |
| 4 | 22.2 | — | 12 | 24 | 1.2 | — | 38.6 | 2 |
| 5 | — | — | 40 | — | 1.2 | — | 56.8 | 2 |

The following amounts of the types of granules from the various silos are supplied to a drum-type mixer VII via dosing device VI (Table 1) and mixed for 10 minutes at ambient temperature in a dry inert atmosphere. The mixtures obtained are bagged in polyethylene bags with a capacity of 25 kg.

Analysis of the contents of different bags of the same composition reveals no differences.

The following experiments were carried out using composition 1 to establish whether segregation of the different granules occurs during transport.

Experiment 1: A glass cylinder was filled with the granule mixture and covered with a foam-rubber lid. The cylinder was vibrated for 30 minutes at a frequency of 25 Hz and an amplitude of 0.8 mm. The composition was found to be compacted. The distribution of the carbon-black concentrate granules remained the same.

Experiment 2: In a "pouring test" a glass hopper (1.3 liters) was filled with a granule mixture. The hopper was emptied by opening its outlet (diameter 2 cm). The granules dropped from a height of 25 cm and formed a cone from whose top, centre and base samples were taken. The samples were characterised on the basis of their residual ash content and the concentration of carbon-black granules. Within the accuracy of the measurement, the residual ash content and the concentration of carbon-black granules in the various parts of the cone corresponded to those of samples taken from the granule mixture prior to pouring.

Experiment 3: The behaviour during pneumatic conveyance was studied using the following test set-up, in which granules were sucked from a transport bag into a flexible, ribbed hose with a length of about 25 m. The granules were then conveyed at high speed to a pre-hopper, and from there batch by batch every 60 seconds to a sealed hopper. In total, 15 kg of composition 1 was conveyed to the hopper in this way.

The hopper was emptied in portions of approx. 1 kg. and the composition of the various portions was analysed, using the concentration of carbon-black concentrate granules as an indication. No statistic difference was detected between the compositions of the granule mixtures of the initial phase, samples 1-3, the stationary phase, samples 5-12, and the final phase of conveyance, samples 14-16, and the composition of granule mixture 1 in the transport bag.

Experiment 4: in another practical test, glass cylinders filled with granule mixtures 1 and 2 were transported by car over a distance of 2000 km. During this transport no observable segregation occurred.

EXAMPLE III AND COMPARATIVE EXPERIMENT A

Next, granule mixtures 1-5 were used to injection-mould specimens using a Nestal 130 (screw diameter 40 mm.) injection-moulding machine. The granule mixture was to this end poured from the transport bags into the hopper of the injection-moulding machine. In comparative experiments, granules in which compositions 1-5 were compounded in a conventional manner, i.e. all the additives were mixed with the polymer in the desired ratio in a single step in the melt in an extruder and extruded into granules, were also used to injection-mould specimens under the conditions of screw a.

Three screws were tested in the injection-moulding machine, notably:
a) a standard 3-zone screw (compression ratio 1.8)
b) a 3-zone screw (compr.ratio 1.8) fitted with an extra mixing ring ("Twente Mixing Ring")
c) a 3-zone screw (compr. ratio 1.8) with a Maddock element with five pairs of channels plus a pine-apple type mixing cone.

The mixing effect increases from screw a to screw c. The following properties, amongst others, of the specimens were measured; the tensile strength according to ISO 527/1 B, 23° C., 5 mm/minute, the elongation at break, the modulus of elasticity and the Izod (ISO 180/1A), notched, hammer 2.75 J.

This showed that the effect of the different types of screws on the mechanical properties of the specimens is not significant.

The tensile strength of the specimens based on granule mixtures 1-4 was a fraction lower (at most 7%) than that of the specimens based on precompounded granules. The tensile strength of granule mixture 5, which contained no glass fibre, was the same as that of the compound.

The elongation at break and the IZOD of granule mixtures 1-4 was higher than that of the specimens based on the corresponding compounds.

The elongation at break of granule mixture 5 was smaller, but the IZOD impact resistance (measured using a 5.5J hammer) was substantially higher. The modulus of elasticity of the glass-fibre reinforced compositions was up to several percent lower in the case of the specimens obtained with the granule mixtures than in the case of the specimens based on the compound. No difference was detectable in the case of composition 5.

The surface of the specimens obtained on the basis of the granule mixtures was poorer in the case of those containing glass fibre (compositions 1-4) than in the case of the specimens based on the corresponding compounds. The opposite effect was observed in the case of the specimens with composition 5. By distributing the Ca stearate on all the granules in the mixer VIII, instead of in the granules, $V^e$, a very smooth surface was obtained in all cases (Example IV).

The difference in mechanical properties is probably attributable to a shorter glass fibre length on the one hand and better dispersion of the rubber phase in the specimens obtained from the granule mixture on the other. Interestingly, both the glass fibre length and the rubber dispersion (particle size) in the granules is the same as that in the specimen.

Incorporating glass fibres in the granules in the granule mixture in the polyamide matrix is further improved by using greatly improved conditions for mixing glass fibre in a polyamide matrix instead of the standard conditions under which compounds containing glass fibre are produced, according to which a polyamide with a lower viscosity, PA-6 from $I^B$, is melted in a first part of the extruder and the glass fibre is subsequently dosed via a side-feed. When the granule mixture contains granules thus obtained the stiffness and tensile strength of the injection-moulded specimens prove to be at least equal to those obtained by injection-moulding precompounded granules.

The above examples and experiments show that with the process according to the invention any additive may be optimally mixed and the better properties thus obtained are evident in the products obtained by melt-shaping the granule mixtures according to the invention.

The invention claimed is:

1. Process for preparing a granulate suitable for being supplied to an installation for melt-shaping a polymer composition comprising a matrix polymer and at least three additives, said process comprising the steps of:
   (i) mixing at least four different granule fractions, at least one granule fraction of the four granule fractions consisting of the matrix polymer and, optionally, one or more additives that are present in all granule fractions, and at least three other granule fractions of the four granule fractions comprising the matrix polymer and a different additive in a concentration that is between 1.5 and 30 times larger than the concentration of the different additive in the final composition, wherein a combination of colorants is regarded as a single additive, and
   (ii) collecting a mixture of the at least four different granule fractions from step (i) in a storage device.

2. Process according to claim 1, wherein the additives are chosen from the group of stabilisers, processing aids, flame retardants, agents for improving impact resistance, reinforcing fibre materials, fillers and other polymers.

3. Process according to claim 1, wherein each granule fraction comprising a different additive comprises essentially only one said different additive.

4. Process according to claim 1, wherein one or more of the granule fractions comprises an additive coated on the granules.

5. Process according to claim 1, wherein a coating of one or more additives is applied to the granules during or after mixing of the granule fractions.

6. Process according to claim 1, wherein said at least one granule fraction contains said at last one or more additives.

7. Process for the preparation of a granule mixture suitable for being supplied to an installation for melt-shaping a polymer composition comprising a matrix polymer and at least three additives, said process including mixing at least four different granule fractions, each granule fraction consisting of granules comprising the matrix polymer and a different additive or no additive, wherein a combination of colorants is regarded as a single additive, said process comprising:
   a. adding a polymer in a granular form or optionally in a melted form obtained in a polymerization process to a series of parallel-connected mixing devices;
   b. mixing, in each mixing device, polymer with a controlled amount of an additive, optionally followed by shaping to granules;
   c. subsequently separately conveying the granules obtained under b) from the individual mixing devices to different storage vessels arranged in parallel;
   d. conveying granules from at least three of such parallel storage vessels to a dosing device;
   e. separately dosing these different granule streams obtained under b) and a stream of polymer granules obtained directly from the polymerization process, optionally via interim storage, to a mixer;
   f. mixing the granule streams in this mixer at a temperature below the polymer granules' melting point to obtain a homogeneous granule mixture of the desired composition; and
   g. discharging the granule mixture obtained from the mixing device to means of conveyance to a processing installation for the granule mixture.

8. Process according to claim 7, further comprising applying a coating of one or more additives to the granule mixture in or downstream of the mixing device.

9. Granule mixture, suitable for being supplied to an installation for melt-shaping a polymer composition, consisting of at least four different granule fractions, at least one granule fraction of the four granule fractions consisting of the matrix polymer, and, optionally, one or more additives that are present in all granule fractions, and at least three other granule fractions of the four granule fractions comprising the matrix polymer and a different additive in a concentration that is between 1.5 and 30 times larger the concentration of the different additive in the final composition, wherein a combination of colorants is regarded as a single additive, and wherein the granule mixture to provide a packaged granule mixture is packaged in a packaging container for transportation of the granule mixture from a granule mixing device to a shaping device.

10. Granule mixture according to claim 9, wherein said at least one granule fraction contains said at last one or more additives.

11. Granule mixture according to claim 9, wherein additives are chosen from the group of stabilizers, processing aids, flame retardants, agents for improving impact resistance, reinforcing fiber materials, fillers and other polymers.

12. Granule mixture according to claim 9, wherein each of said at least two granule fractions comprises essentially only one said different additive.

13. Granule mixture according to claim 9, wherein in one or more of the granule fractions an additive is coated on the granules.

14. Granule mixture according to claim 9, wherein all the granules are of approximately the same shape and size to minimize granule segregation during transport or handling of the mixture.

15. Process for melt-shaping a polymer composition, comprising supplying the polymer composition to a device for melt-shaping, wherein the polymer composition is supplied in the form of a granule mixture according to claim 9.

16. Process according to claim 6, wherein said at least one or more additives is present in said at least one granule fraction and is a stabilizer or a stabilizer composition.

17. Granule mixture according to claim 10, wherein said at least one or more additives is present in said at least one granule fraction and is a stabilizer or a stabilizer composition.

18. Process according to claim 1, wherein the storage device is a transportable device suitable for delivery of the granulate to the installation for melt-shaping by an end user.

19. Process according to claim 18, wherein the transportable device comprises a bag.

20. Process according to claim 19, further comprising transporting the transportable device to the end user.

21. Process for melt-shaping a polymer composition comprising providing a packaged granule mixture according to claim 9 and transferring the polymer composition from the packaging container to a device for melt-shaping.

22. Process according to claim 7, wherein in step b) only one additive is mixed in each mixing device.

23. Process according to claim 22, wherein the polymer in granular form or, optionally in a melted form, comprises a stabilizer or a mixture of stabilizers.

24. Process according to claim 1, wherein said at least one granule fraction consists of only the matrix polymer.

25. Granule mixture according to claim 9, wherein said at least one granule fraction consists of only the matrix polymer.

* * * * *